(12) United States Patent
Itakura et al.

(10) Patent No.: US 7,724,552 B2
(45) Date of Patent: May 25, 2010

(54) POWER SUPPLY

(75) Inventors: Kazuhiko Itakura, Kawasaki (JP);
Hiroshi Shimamori, Kawasaki (JP);
Isamu Aoki, Kawasaki (JP)

(73) Assignees: Fujitsu Limited, Kawasaki (JP); Fujitsu Access Limited, Kawasaki (JP)

( * ) Notice: Subject to any disclaimer, the term of this patent is extended or adjusted under 35 U.S.C. 154(b) by 0 days.

(21) Appl. No.: 11/203,178

(22) Filed: Aug. 15, 2005

(65) Prior Publication Data

US 2006/0209580 A1    Sep. 21, 2006

(30) Foreign Application Priority Data

Mar. 17, 2005    (JP)    ............... 2005-078003

(51) Int. Cl.
*H02J 1/10*    (2006.01)
(52) U.S. Cl. ...................................... 363/65
(58) Field of Classification Search ............ 363/65,
363/71, 72, 131, 132, 147
See application file for complete search history.

(56) References Cited

U.S. PATENT DOCUMENTS

| | | | |
|---|---|---|---|
| 4,860,153 A * | 8/1989 | Ishii ............................ | 361/94 |
| 5,638,264 A | 6/1997 | Hayashi et al. | |
| 5,768,117 A | 6/1998 | Takahashi et al. | |
| 6,465,909 B1 | 10/2002 | Soo et al. | |

FOREIGN PATENT DOCUMENTS

| | | |
|---|---|---|
| EP | 4-26316 | 1/1992 |
| EP | 2001-161063 | 6/2001 |
| JP | 2-26267 | 1/1990 |
| JP | 7-194118 | 7/1995 |
| JP | 7-219651 | 8/1995 |

OTHER PUBLICATIONS

Laszio Balogh, Application Notes SLUA128A, TI/Unitrode, Jan. 2003, Rev. A, pp. 1-12.*
Guerrero et al., Parallel Operation of Half-Bridge Converters with current Doubler Rectifier Using Feedback Linearization Control, 2004, pp. 1159-1164.*

(Continued)

*Primary Examiner*—Bao Q Vu
*Assistant Examiner*—Jue Zhang
(74) *Attorney, Agent, or Firm*—Staas & Halsey LLP

(57) ABSTRACT

A power supply to be connected in parallel to one or more other power supplies so as to share with the other power supplies in supplying load current to a load is disclosed. The power supply includes a load current comparison part including a first input terminal and a second input terminal and outputting a difference in level between a first signal applied to the first input terminal and a second signal applied to the second input terminal. The load current comparison part includes a differential amplifier. A first input terminal of the differential amplifier is connected to a first input terminal of the differential amplifier of each of the other power supplies. A signal indicating a load current supplied by the power supply is input to a second input terminal of the differential amplifier. A non-directional impedance element is inserted between the first and second input terminals of the differential amplifier.

12 Claims, 16 Drawing Sheets

OTHER PUBLICATIONS

Balogh, Laszlo, "The UC3902 Load Share Controller and its Performance in Distributed Power Systems", Application Note U-163, Unitrode Corporation, pp. 1-8.

Hiroshi Shimamori et al. "Abnormal Phenomenon of Output-Voltage Increase and It's Solution in Parallel-Redundant DC-DC Converter System with Current Sharing Control" Telecommunications Conference, 2005, Intelec '05. Twenty-Seventh International, IEEE, PI, Sep. 1, 2005, pp. 557-562, XP031063347.

Japanese Office Action No. 2005-078003 mailed Jan. 26, 2010.

Extended European Search Report Dated Dec. 23, 2009.

* cited by examiner

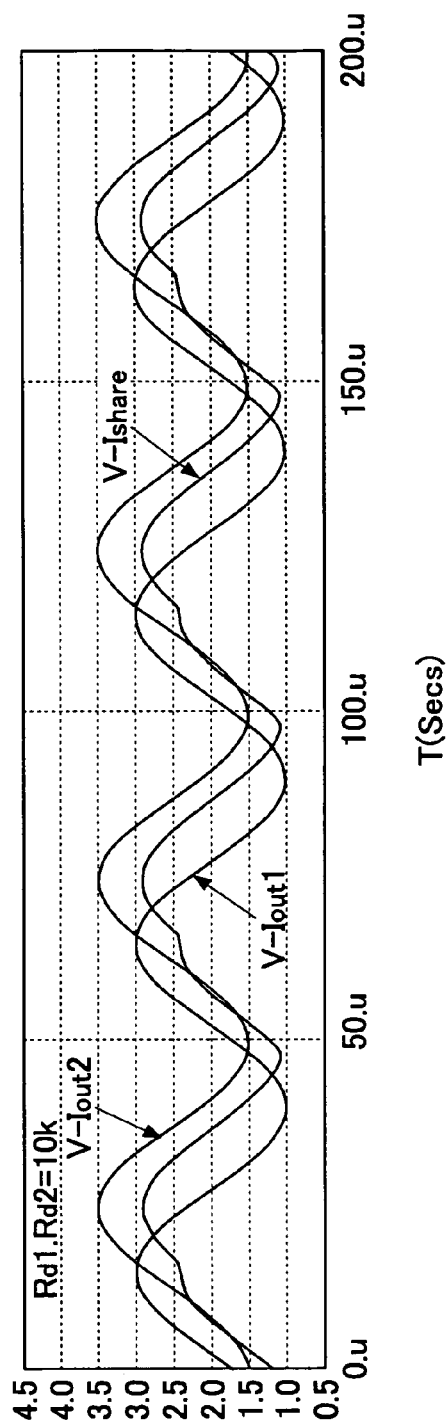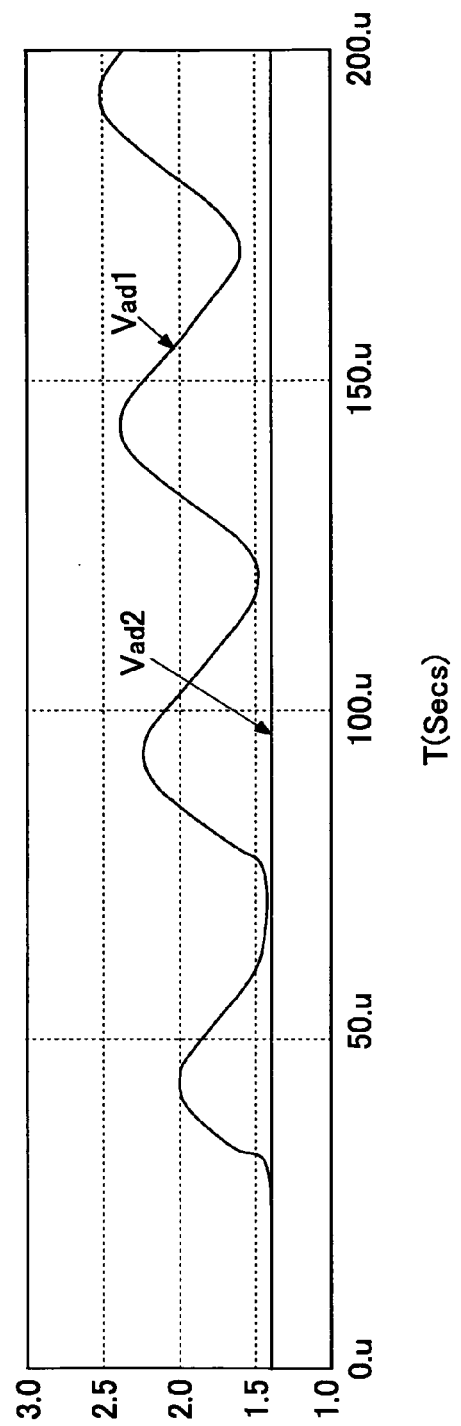
FIG.9A PRIOR ART
FIG.9B PRIOR ART is a provided. As this current balance function, the average current mode, in which a DDC compares its output current with that of another DDC and finely adjusts output voltage based on the comparison results, is widely used.

POWER SUPPLY

BACKGROUND OF THE INVENTION

1. Field of the Invention

The present invention relates generally to power supplies, and more particularly to a power supply configured to be connected in parallel to one or more power supplies so as to share with the other power supplies in supplying load current.

2. Description of the Related Art

In recent years, so-called POL (Point of Load), which puts small-capacity DC/DC converters (hereinafter simply referred to as DDCs) into parallel operation and places them in the immediate vicinity of a load, has been commonly employed instead of the conventional centralized power architecture as power supply configuration for large-scale server systems. At this point, in order to increase the reliability of the DDCs operating in parallel, a so-called current balance function that equalizes the output currents of the DDCs for thermal balance among the DDCs is provided. As this current balance function, the average current mode, in which a DDC compares its output current with that of another DDC and finely adjusts output voltage based on the comparison results, is widely used.

Meanwhile, in a system used in a mission critical environment, DDCs are used in the so-called N+1 parallel redundant mode, and the highest current mode, which makes it possible to maintain the current balance function even if one of the DDCs fails, is used. According to this N+1 parallel redundant mode (alternatively, also referred to as the N+1 parallel operation mode), another extra DDC is added to N DDCs necessary for a required power supply capacity on the load side so that the condition of the required power supply capacity can be satisfied even if one of the DDCs becomes unusable due to failure. Reference may be made to Japanese Laid-Open Patent Application No. 7-194118 (hereinafter, JP 7-194118) and Balogh, Laszlo; THE UC3902 LOAD SHARE CONTROLLER AND ITS PERFORMANCE IN DISTRIBUTED POWER SYSTEMS, APPLICATION NOTE U-163, Unitrode Corporation (hereinafter, Balogh) for the conventional technology.

In a unit-type DDC used in the conventional centralized power architecture, the inductance of a bus bar connecting a power supply and a load is high, so that a large load capacitor is provided in the vicinity of the load. This capacitor absorbs sharp variations in load current, so that the output current of the DDC has a low-frequency sinusoidal waveform from which high frequency components are removed.

Nowadays, however, according to POL, this bus bar is omitted, the DDC is responsive at higher speed, and the load capacitor is reduced. As a result, the output current of the DDC tends to vary sharply so as to include a lot of high frequency components. This sharp variation in the output current affects a current balance circuit of Highest Current Mode, so that the problem of increasing output voltage tends to occur. In particular, this problem is prominent in a DDC for memory, in which a sharp variation is periodically caused in load current, so that there is the possibility of occurrence of memory operation error and, further, system down due to activation of the overvoltage protection circuit of the DDC. Further, in the current balance circuit of the highest current mode, periodic variations in load current may cause an increase in output voltage. A new circuit method for solving these problems is desired.

In general, the following four modes are employed for the current balance circuit. They have respective characteristics and are used accordingly. In particular, of the four modes, the highest current mode is employed for the N+1 parallel redundant mode, which requires reliability, as described below.

The droop mode reduces output voltage by a certain amount when output current increases. This mode has a circuit configuration shown in FIG. 1, and is frequently employed in a front end bus power supply of 48 V or 12 V. However, this is not applied as the latest power supply for high-accuracy LSIs requiring low voltage and large current because of difficulty in ensuring voltage accuracy.

The master-slave mode, in which one DDC serves as a master and supplies a pulse signal to each slave DDC, is characterized by a simple circuit. However, when the master DDC fails, all the DDCs are down. Accordingly, this is not applied to the N+1 parallel redundant operation.

The average current mode, in which a DDC compares its current with the current of another DDC and finely adjusts output voltage based on their average, has a circuit configuration shown in FIG. 2. According to this mode, if one of multiple DDCs falls into an overcurrent pendent state or fails, current balance line voltage decreases so that the current balance function is lost. Accordingly, this is not applied to the N+1 parallel redundant operation.

The highest current mode has a circuit configuration shown in FIG. 3. In this mode, a DDC compares its current with a reference, which is the maximum one of the output current values of N DDCs operating in parallel, and balances its current (FIG. 2 of JP 7-194118 and FIG. 1 of Balogh).

According to this mode, by inserting a diode in the terminal part of a current share bus, a current sense amplifier is automatically detached from the bus when a DDC fails. As a result, even after this, the current balance function can be maintained among the remaining N DDCs. Accordingly, this mode is employed in the N+1 parallel redundant operation mode.

On the other hand, in recent years, there has occurred a problem in that when the above-described current balancing of the highest current mode is employed in POL, output voltage increases so as to cause memory operation error and, further, lead to system down.

FIG. 4 shows signal waveforms at the time of an output voltage increase actually generated in DDCs for memory in a server system.

DDC specifics in this case are as follows:
insulating card edge type;
switching frequency=600 kHz;
current mode;
highest current mode current balancing;
Vin=48 V;
Vout=2.5 V;
Iout=40 A; and
number of paralleled DDCs=3+1 parallel redundant operation.

Loads are 32 1-GB DDR memory cards, and a load capacitor is approximately 10,000 µF.

Other specifics are Vout=200 mV/D, Iout=0.5 V/D, and 50 mS/D.

FIG. 4 shows a 2.5 V output voltage waveform (CH4=Vout in the drawing) and the output current waveforms of the three DDCs (CH1, CH2, and CH3 in the drawing).

In the initial stage, the output current of each DDC is approximately 18 A, and the current balance function works normally. Thereafter, a load current varies in accordance with the operations of the DDR memory cards, but the output current follows up while balancing.

However, from about the fifth cycle, the output currents of the DDCs start to differ in size from and be out of phase with one another, and the output voltage starts to rise from 2.5 V, and finally, rises up to 3.3 V. As a result, an overvoltage protection circuit functions to stop the operation of each DDC, thus causing system down.

Such a phenomenon occurs only occasionally depending on conditions such as the arrangement of and the differences between DDCs and the number and the operation mode of DDR memory cards. Accordingly, it is difficult to discover its possibility with a test apparatus, and it is predicted that this phenomenon occurs in a field so as to result in a serious problem.

The mechanism of occurrence of this output voltage increase in the highest current mode is analyzed below based on circuit simulation results.

FIG. 5 shows a highest-current-mode current comparator circuit used in this analysis.

First, a discussion is made of the operation in the case where the load currents of DDCs vary in the same phase and in the same state.

Here, the Ishare terminal of each DDC is opened so as to cause the DDC to operate independently. The operation of the output voltage waveform Vad1 of the current comparator circuit is obtained by applying its own output current waveform V-Iout1 to the DDC.

FIG. 6A shows the operational waveform of the variation frequency of 2 kHz of V-Iout1 in a case where a resistor Rd is 200 kΩ in this case.

As shown in FIG. 6B, when the variation frequency of the output current is low, Vad1 operates normally without a voltage increase.

Next, FIG. 7A shows operational waveforms in the case of increasing the variation frequency by ten times to 20 kHz and successively changing the value of the resistor Rd from 500 kΩ to 200 kΩ and 10 kΩ.

As shown in FIG. 7A, when Rd is 200 kΩ, the voltage V-Ishare of the Ishare terminal is higher than V-Iout1 voltage for a longer period of time because the discharge speed of a capacitor Cg is lower than the variation of the output current. As a result, as shown in FIG. 7B, Vad1 increases because of the repeated variation of the output current.

When the value of the resistor Rd is set to 500 kΩ, Vad1 further increases (FIG. 7B). This increase in Vad1 results in an increase in the output voltage.

It is shown that next, when the value of the resistor Rd is reduced to 10 kΩ, the discharge speed of Cg becomes higher than the variation speed of V-Iout, so that it is possible to prevent Vad1 from increasing (FIGS. 7A and 7B).

It has been found that the problem of voltage increase can be improved by thus reducing the value of the resistor Rd connected in parallel to the capacitor Cg.

However, in the case of reducing the value of the resistor Rd, the following two problems occur.

The first one is that a forward drop in a diode D1 connected between the input terminals of a differential amplifier (adjustment amplifier) A1 increases so as to increase a differential input with respect to a current balancing operation. The second one is that a current flowing to the Ishare terminal increases so as to make it necessary to improve the driving capability of a current detection amplifier (current amplifier).

As a further increase in DDC operational frequencies and response speed is desired for the future, it will become necessary to increase the discharge speed of the capacitor Cg by further reducing the value of the resistor Rd. Accordingly, it is desired to solve these problems.

In the conventional centralized power system, a unit power supply, which is slow in response speed, is employed, and power is supplied to a load with a bus bar having a high inductance component. In this case, since the output impedance of the power supply rises from a low frequency domain, a large capacitor is added in the vicinity of the load. The inductance component and the load capacitor serve as filters so that the load current of the unit power supply becomes sinusoidal. As a result, overshoot and undershoot are kept low.

However, in the case of POL, connection line inductance is low, and the load capacitor is small. Accordingly, DDCs vary greatly in the inductance of their smoothing circuits, and differ greatly in the inductance and resistance of connection lines to the load. These elements may affect the output current waveforms of the DDCs.

As a result, an amplitude difference and a phase difference are generated between the overshoot and undershoot waveforms of the output currents of the DDCs as shown in FIG. 8. FIGS. 9A and 9B shows the operational waveforms of the current balance circuits of DDCs in the case where such output currents flow.

FIGS. 9A and 9B show the results of a simulation performed with application of a circuit configuration in which two circuits of FIG. 5 are connected.

FIGS. 9A and 9B show that the output voltage Vad1 of the comparator circuit increases because of the phase difference between the output currents of the two DDCs. In this case, reducing the value of the resistor Rd to 10 kΩ cannot completely solve the problem of output voltage increase generated because of variations in the load current.

SUMMARY OF THE INVENTION

Accordingly, it is a general object of the present invention to provide a power supply in which the above-described disadvantage is eliminated.

A more specific object of the present invention is to provide a power supply to be connected in parallel to one or more other power supplies, which can follow a sudden change in a load at high speed.

The above objects of the present invention are achieved by a power supply to be connected in parallel to one or more other power supplies so as to share with the other power supplies in supplying load current to a load, the power supply including: a load current comparison part configured to include a first input terminal and a second input terminal and output a difference in level between a first signal applied to the first input terminal and a second signal applied to the second input terminal, wherein the load current comparison part includes a differential amplifier, a first input terminal of the differential amplifier is connected to a first input terminal of a differential amplifier of each of the other power supplies, a signal indicating a load current supplied by the power supply is input to a second input terminal of the differential amplifier, and a non-directional impedance element is inserted between the first and second input terminals of the differential amplifier.

The above objects of the present invention are also achieved by a power supply to be connected in parallel to one or more other power supplies so as to share with the other power supplies in supplying load current to a load, the power supply including: a load current comparison part configured to compare a signal indicating a maximum one of load currents of the power supplies and a signal indicating a load current supplied by the power supply; and a non-directional impedance element inserted between input terminals of the load current comparison part.

In the conventional configuration shown in FIG. 3, a diode is connected between the input terminals of a differential amplifier. Accordingly, with a capacitor for high frequency removal (capacitor Cg) being charged, the potential difference between the differential input terminals of the differential amplifier tends to increase more than required because of a blocking operation in a particular direction by the diode. As a result, the above-described problem of voltage increase (FIGS. 7B and 9B) tends to occur.

On the other hand, according to one aspect of the present invention, a non-directional impedance element is inserted between the differential input terminals of a differential amplifier (or a load current comparison part), so that the above-described problem is solved and it is possible to prevent occurrence of the problem of voltage increase.

Thus, according to one aspect of the present invention, in a power supply, a non-directional impedance element is inserted between the differential input terminals of a differential amplifier (or a load current comparison part), so that the differential output value of the differential amplifier is prevented from increasing more than necessary even when a maximum load current value is higher than its own load current value of the power supply. As a result, by providing a capacitor for high frequency removal, it is possible to prevent abnormal oscillation. Further, it is possible to provide a power supply that can ensure prevention of occurrence of the above-described problem of voltage increase even when a directional impedance element for cutting off a signal indicating the load current value of the power supply when it is lower than the maximum load current value is provided.

BRIEF DESCRIPTION OF THE DRAWINGS

Other objects, features and advantages of the present invention will become more apparent from the following detailed description when read in conjunction with the accompanying drawings, in which:

FIGS. 9A and 9B are waveform charts for illustrating the conventional problem;

DETAILED DESCRIPTION OF THE PREFERRED EMBODIMENTS

Figure 10:
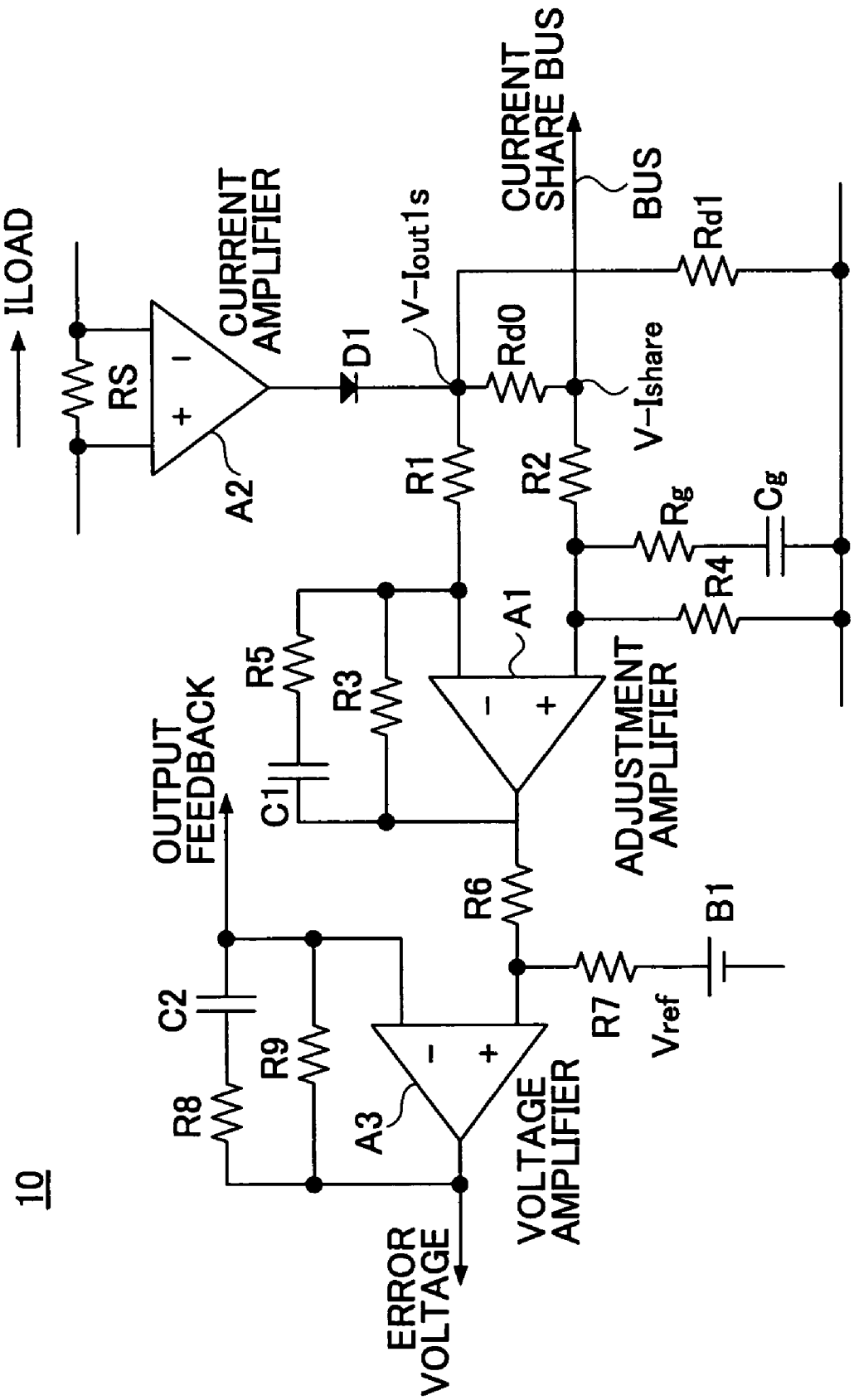
FIG. 10 is a circuit diagram showing a current balance circuit according to an embodiment of the present invention.

According to an embodiment of the present invention, in a power supply having parallel-connected multiple DDCs, a configuration shown in FIG. 10 is employed where a resistor Rd0 is connected between the current reference signal V-Ishare and the current detection signal V-Iout1s of a current balance circuit 10 of each DDC, and a resistor Rd1 is connected between the current detection signal V-Iout1s and ground (GND).

Figure 15A:
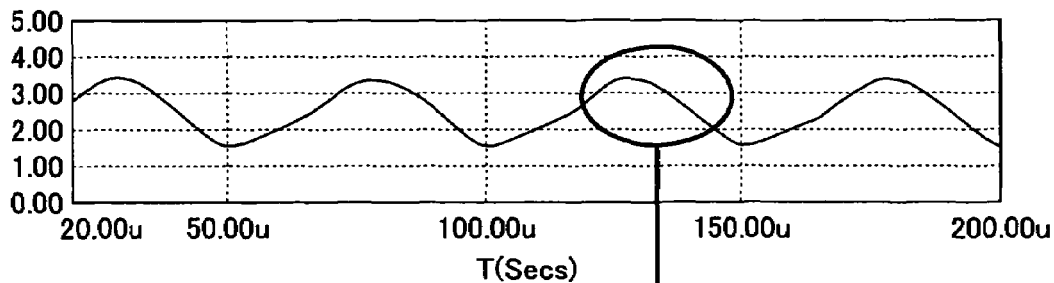
FIGS. 15A through 15D are waveform charts for illustrating an operation and effect of the configuration of FIG. 10 according to the embodiment of the present invention.
Figure 15B:
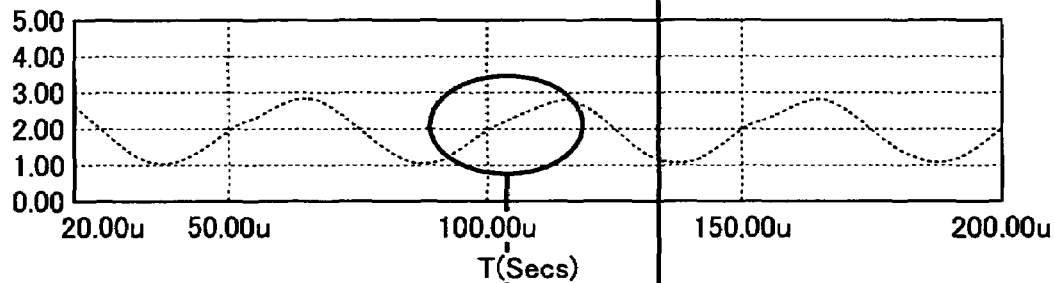
Figure 15C:
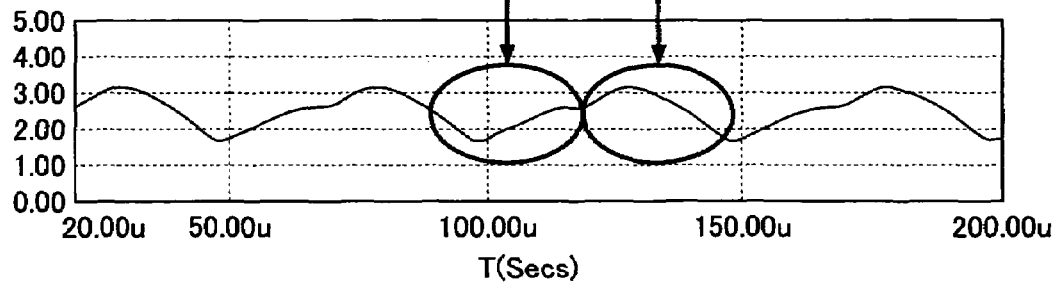

As a result, in the DDC, if V-Ishare is higher than an electric potential indicating its own output current (the output potential of a current detection amplifier A2), V-Iout1s increases through the resistor Rd0 in accordance with V-Ishare. As a result, the maximum value of the current detection signal V-Iout1s matches the current reference signal V-Ishare (FIGS. 15A and 15C). Thus, current balance control that follows up a maximum current value is enabled.

Figure 17A:
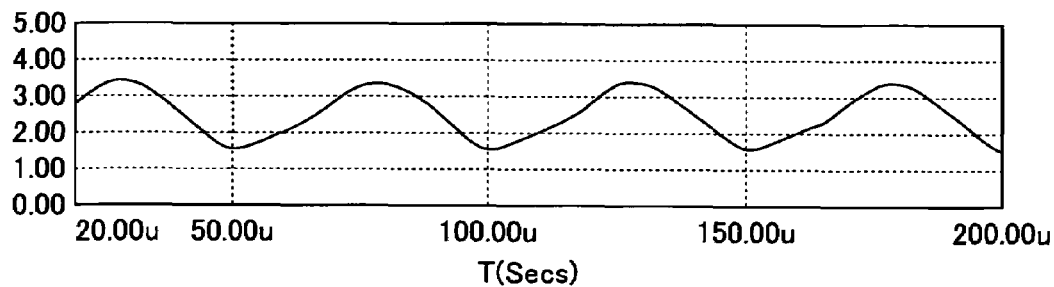
FIGS. 17A through 17D are waveform charts for illustrating a conventional problem according to the embodiment of the present invention.
Figure 17B:
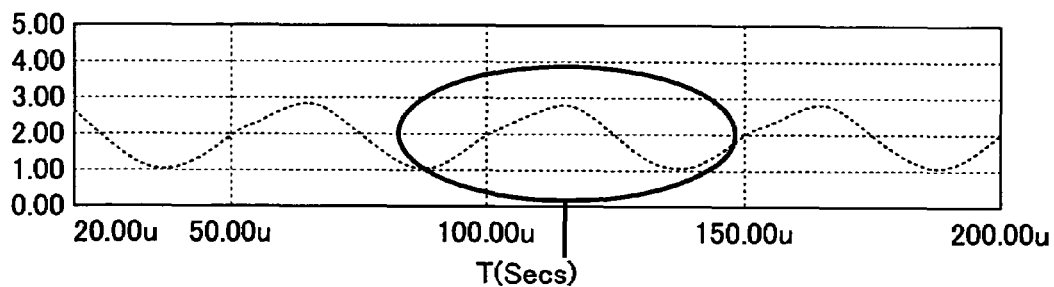
Figure 17C:
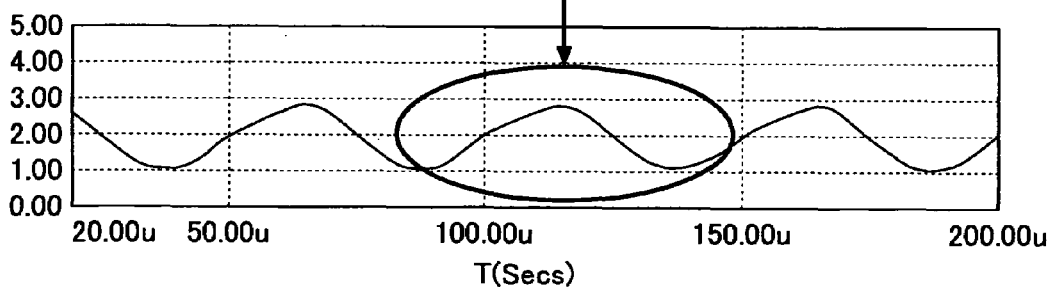
Figure 17D:
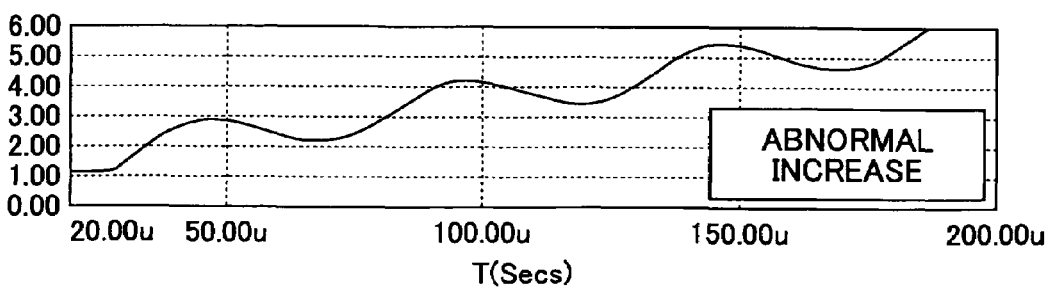

On the other hand, in the case of a conventional circuit configuration, the diode D1 is connected between the differential input terminals of the differential amplifier (adjustment amplifier) A1. Therefore, as shown in FIGS. 17B and 17C, in the DDC, if V-Ishare (FIG. 17A) is higher than the electric potential indicating its own output current (the output potential of the current detection amplifier A2), this signal is blocked by the diode D1 so as to prevent a corresponding increase of V-Iout1s. In consequence, the level of V-Iout1s remains at the level of the electric potential indicating its own output current (the output potential of the current detection amplifier A2). As a result, the differential input to the differential amplifier (adjustment amplifier) A1 increases, so that its differential output gradually increases as shown in FIG. 17D. As a result, the above-described problem of voltage increase occurs.

In this embodiment, as described above, this problem is solved by inserting the resistor Rd0 instead of the diode D1 between the input terminals of the differential amplifier A1.

Figure 15D:
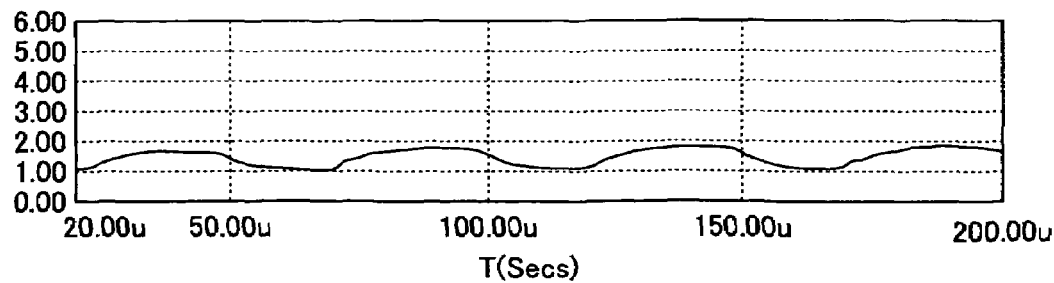
Figure 16:
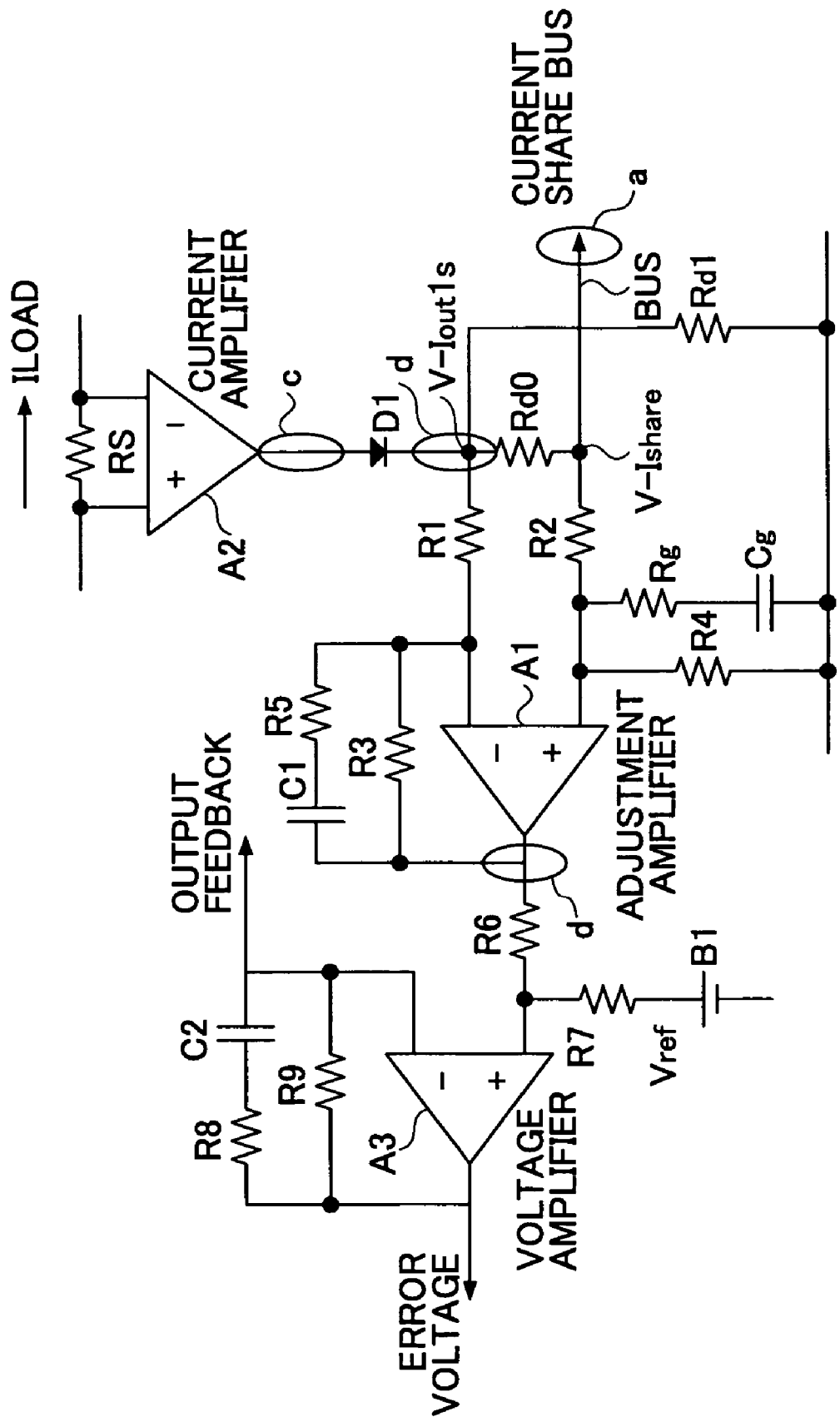
FIG. 16 is a circuit diagram for illustrating the operation and effect of the configuration of FIG. 10 according to the embodiment of the present invention.
Figure 18:
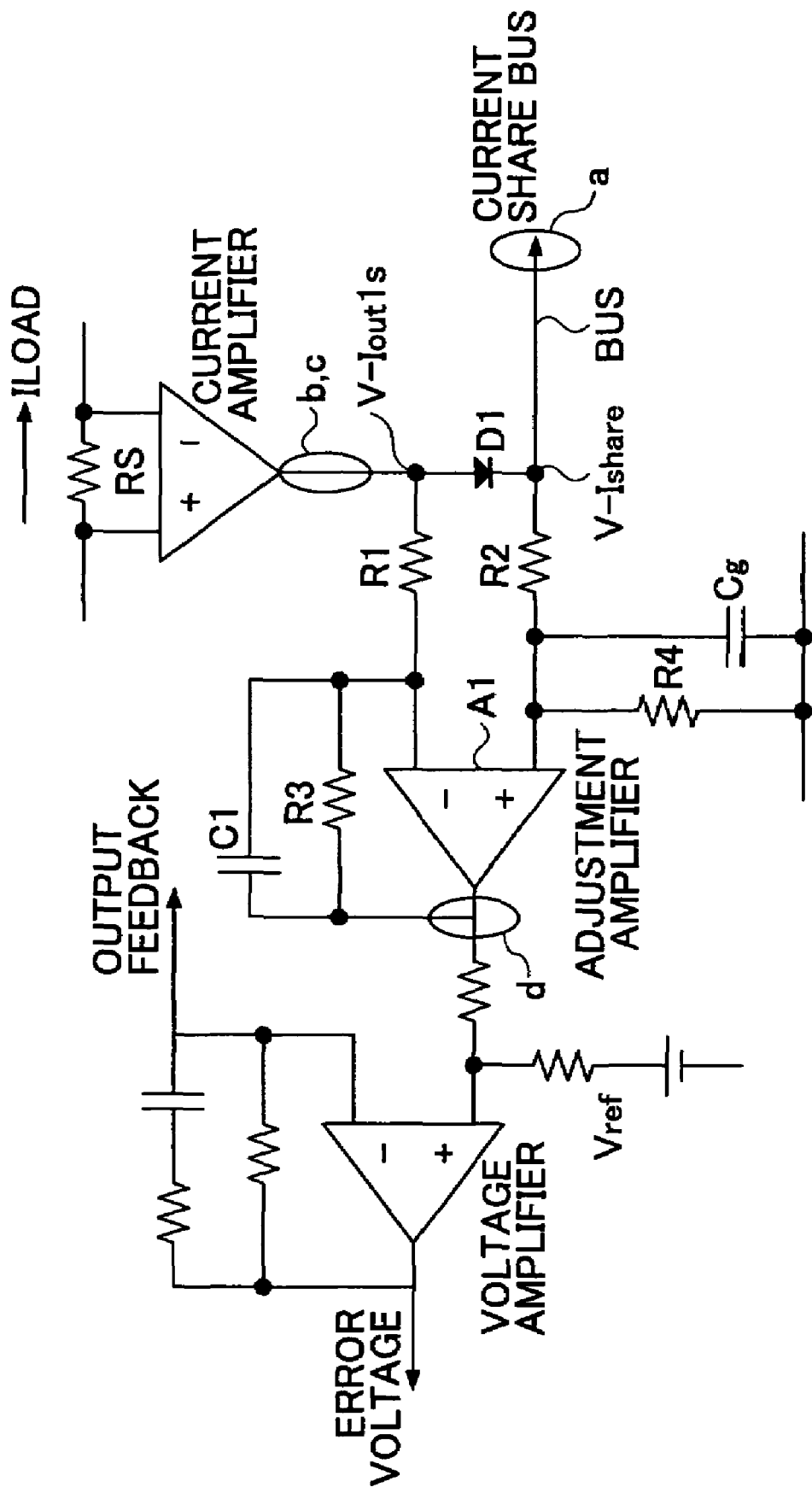
FIG. 18 is a circuit diagram for illustrating the conventional problem according to the embodiment of the present invention.

FIGS. 15A through 15D show voltage waveforms in the parts of point a through d, respectively, of a circuit configuration shown in FIG. 16. Likewise, FIGS. 17A through 17D show voltage waveforms in the parts of point a through d, respectively, of a circuit configuration shown in FIG. 18.

Further, in this embodiment, the diode D1 is inserted between the output part of the current detection amplifier A2 and the current detection signal V-Iout1s. Accordingly, even if the DDC fails, the current reference signal V-Ishare is prevented from decreasing with a decrease in the V-Iout1s of the failed DDC. This ensures that the operation and effect by the N+1 parallel redundant mode are obtained.

Further, in this embodiment, the capacitor Cg for high frequency removal is provided to the non-inverting input terminal (+ terminal) of the current balance amplifier (differential amplifier) A1 (FIG. 10). It is possible to discharge the capacitor Cg through the resistor Rd1 even when an electric charge is retained in the capacitor Cg. Accordingly, the potential difference between the current reference signal V-Ishare and the current detection signal V-Iout1s can be maintained, so that it is possible to prevent an abnormal increase in output voltage.

Further, in this embodiment, a resistor Rg is inserted in series between the non-inverting input terminal (+ terminal) of the current balance amplifier A1 and the capacitor Cg for high frequency removal. This configuration makes it possible to prevent an electric charge from being stored in the capacitor Cg even in the case of an abrupt change in load current. As a result, the potential difference between the current reference signal V-Ishare and the current detection signal V-Iout1s is maintained, so that it is possible to prevent an abnormal increase in output voltage.

Thus, according to the configuration of this embodiment, the current balance circuit of a DDC can follow up an abrupt high-speed change in a load. This makes it possible to increase the response speed of a voltage stabilizing function, so that it is possible to control a variation in output voltage at the time of the abrupt change in the load.

A description is given below, with reference to the accompanying drawings, of a power supply (FIG. 19) according to the embodiment of the present invention.

FIG. 10 is a circuit diagram showing the current balance circuit 10 of each of parallel-connected multiple DDCs forming the power supply.

The current balance circuit 10 includes the current balance amplifier A1, the current detection amplifier A2, a voltage control amplifier A3, the diode D1, the resistors Rd0, Rd1, and Rg, resistors R1 through R9, the capacitor Cg, capacitors C1 and C2, and a voltage source B1.

The current detection amplifier A2 detects a load current ILOAD, supplied to a load circuit by the DDC including the current balance circuit 10, with difference input terminals through a resistor RS, and outputs the result of the detection.

The diode D1 has the function of blocking a signal when the load current ILOAD supplied to the load by the DDC is lower than the maximum one of the load currents ILOAD supplied by the other DDCs having the same configuration as and connected in parallel to the DDC, the maximum one of the load currents ILOAD being obtained through a current share bus BUS.

The current share bus BUS is connected through the resistor R2 to the non-inverting input terminal (+ terminal) of the current balance amplifier A1, and the output terminal of the current detection amplifier A2 is connected through the diode D1 and the resistor R1 to the inverting input terminal (− terminal) of the current balance amplifier A1. The resistor Rd0 is inserted between these input terminals of the current balance amplifier A1 through the resistors R1 and R2.

Further, the resistor Rd1 is connected through the resistor R1 between the inverting input terminal of the current balance amplifier A1 and ground. Further, a parallel circuit of the resistor R4 and a series circuit of the resistor Rg and the capacitor Cg is connected between the non-inverting input terminal of the current balance amplifier A1 and ground.

Further, a parallel circuit of the resistor R3 and a series circuit of the capacitor C1 and the resistor R5 is connected between the inverting input terminal and the output terminal of the current balance amplifier A1.

Further, the resistor R6 is inserted between the output terminal of the current balance amplifier A1 and the non-inverting input terminal of the voltage control amplifier A3. The voltage source B1 is connected through the resistor R7 to the non-inverting input terminal of the voltage control amplifier A3.

Further, the resistor R9 and a series circuit of the resistor R8 and the capacitor C2 are connected in parallel between the inverting input terminal and the output terminal of the voltage control amplifier A3.

A description is given below of an operation of the current balance circuit 10.

A voltage signal indicating the load current ILOAD as the output current of the DDC detected in the current detection amplifier A2 is input to the inverting input terminal of the current balance amplifier A1 through the diode D1 and the resistor R1.

On the other hand, in the current share bus BUS, which is connected as described above through a resistor to the non-inverting input terminal of the current balance amplifier of the current balance circuit of each of the DDC and the other DDCs connected in parallel thereto, a voltage signal indicating the maximum one of the load currents supplied to the load by these parallel-connected DDCs appears.

That is, in the current balance circuit of each of the parallel-connected DDCs, a voltage signal indicating a load current supplied by the DDC is connected to the current share bus BUS through a series circuit of a diode and a resistor as shown in FIG. 10. As described above, the diode blocks a signal when the level of the voltage signal indicating the load current supplied by the DDC is lower than the electric potential of the current share bus BUS.

In this case, the output potential of the current detection amplifier in the current balance circuit of one of the parallel-connected DDCs which one supplies the maximum load current becomes the highest. As a result, the diodes connected to the current detection amplifiers of the current balance circuits of the other DDCs are in a blocking state. In consequence, an electric potential indicating the load current of the one of the DDCs supplying the maximum load current appears in the current share bus BUS.

The current balance amplifier A1 compares electric potentials input to its input terminals, and outputs an electric potential corresponding to the comparison result. Accordingly, if the maximum one of the load currents of the parallel-connected DDCs becomes larger than the supplied load current detected in the current detection amplifier A2, the output potential of the current balance amplifier A1 increases accordingly.

The output potential of the current balance amplifier A1 is input through the resistor R6 to the non-inverting input terminal of the voltage control amplifier A3. In this case, this signal is input, being superposed on a signal from the voltage source B1 connected through the resistor R7 to the non-inverting input terminal of the voltage control amplifier A3.

Figure 20:
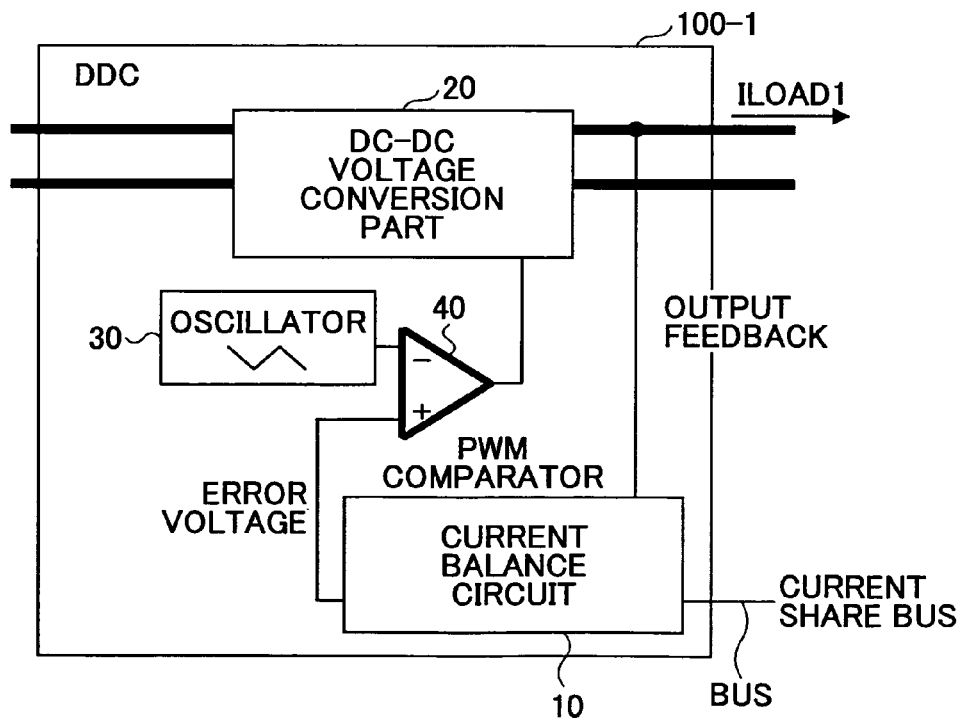
FIG. 20 is a block diagram showing a configuration of each DDC in FIG. 19 according to the embodiment of the present invention.

On the other hand, the inverting input terminal of the voltage control amplifier A3 is connected through the circuit formed of the resistors R8 and R9 and the capacitor C2 to the output terminal of the DDC supplying the load current to the load (FIG. 20). Further, the voltage source B1 has the function of indicating the reference potential Vref of output voltage at the output terminal of the DDC.

The voltage control amplifier A3 performs feedback control so that the output potential of the DDC is equalized with an electric potential in which the reference potential Vref and the output potential of the current balance amplifier A1 are superposed. That is, an error voltage, which is the output potential of the voltage control amplifier A3, is input to the non-inverting input terminal of a PWM comparator 40 (FIG. 20) of the DDC, while a triangle wave of a predetermined frequency (for instance, 600 kHz) is input from an oscillator 30 (FIG. 20) to the inverting input terminal of the comparator 40. As a result, the output of the PWM comparator 40 becomes a pulse signal having duty corresponding to the error voltage. The switching of a rectifier element in a DC-DC voltage conversion part 20 (FIG. 20) of the DDC is performed with this pulse signal. As a result, a DC voltage corresponding to the duty of the pulse signal is output from the DDC. Accordingly, if the error voltage increases, the duty increases, so that the load current increases.

Thus, in the current balance circuit 10 of the DDC, if the maximum one of the load currents of the parallel-connected DDCs is higher than the load current supplied by the DDC, the output voltage of the DDC increases through the above-described operation. As a result, the load current supplied to the load by the DDC increases. This operation is performed in each of the parallel-connected DDCs (DDCs 100-1 through 100-n in FIG. 19), so that load current equalization is automatically performed among the n DDCs.

Figure 1:
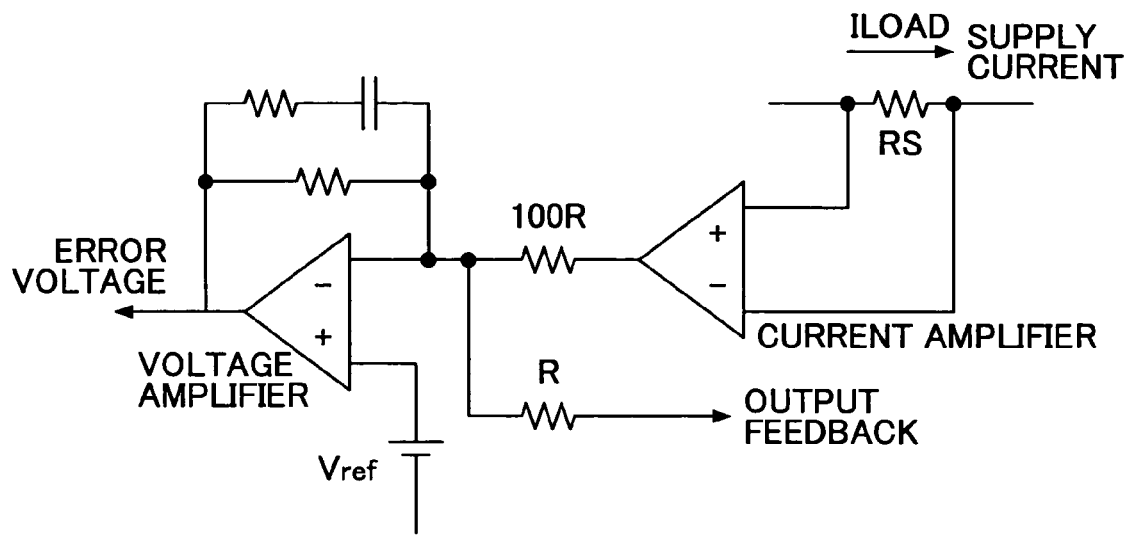
FIG. 1 is a circuit diagram showing a conventional current balance circuit.
Figure 2:
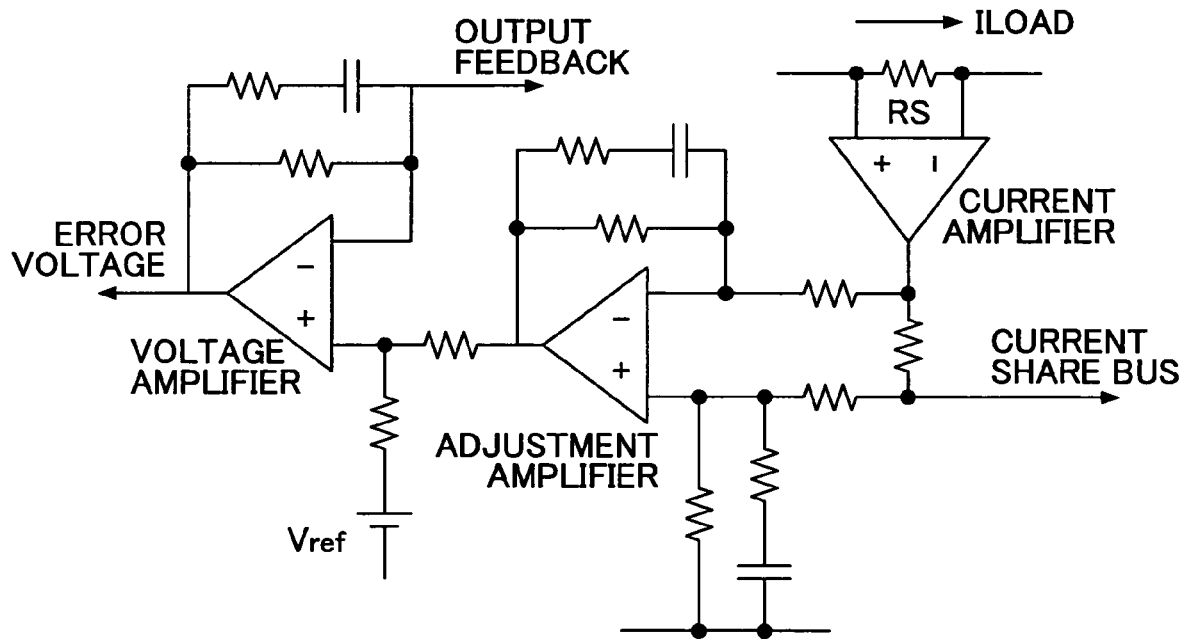
FIG. 2 is a circuit diagram showing another conventional current balance circuit.
Figure 3:
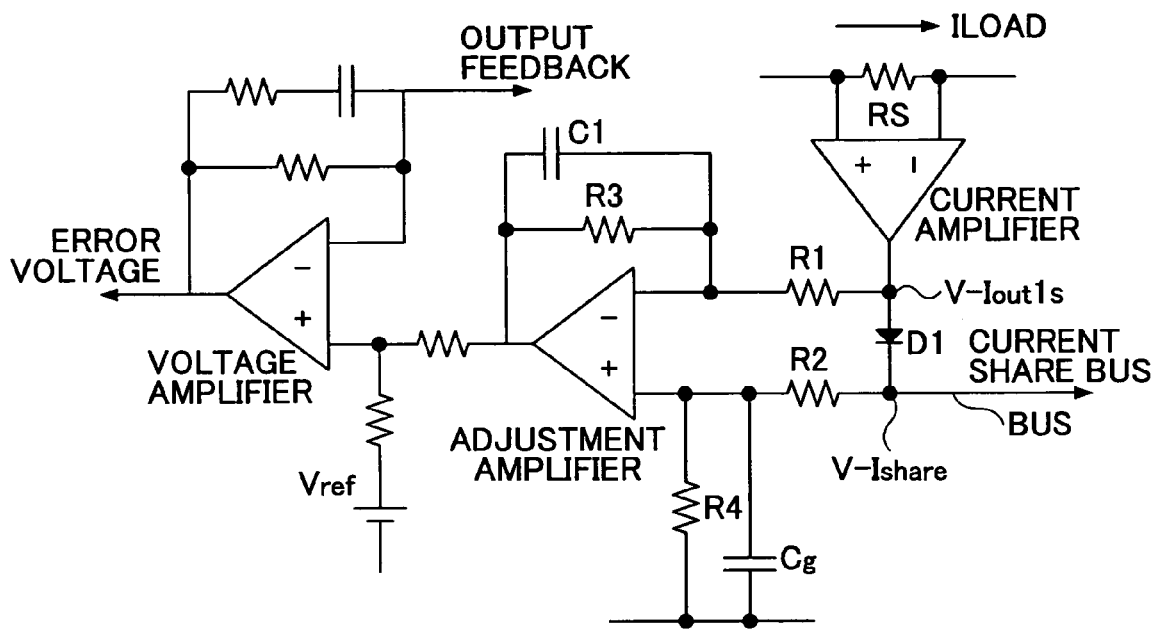
FIG. 3 is a circuit diagram showing yet another conventional current balance circuit.

Referring back to FIG. 10, unlike in the conventional circuit configuration shown in FIG. 3, the resistor Rd0 as a non-directional impedance element is inserted instead of the diode D1 between the input terminals of the current balance amplifier A1 in the circuit configuration of FIG. 10. As a result, as described above, even when the electric potential V-Ishare of the current share bus BUS is higher than the electric potential V-Iout1s indicating its own load current ILOAD, the electric potential V-Ishare affects the electric potential V-Iout1s through the resistor Rd0.

As a result, even in this case, the differential input to the current balance amplifier A1 is prevented from increasing more than necessary, so that the output of the current balance amplifier A1 is prevented from becoming too high. Accordingly, an abnormal increase in the output voltage of the current balance amplifier A1 is prevented (FIGS. 15D and 17D). As a result, a situation is avoided where the current balance function of the power supply is hampered by an abnormal increase in the load current of the DDC.

Further, the capacitor Cg connected through the resistor Rg to the non-inverting input terminal of the current balance amplifier A1 has a high frequency removal function. That is, when high-frequency noise is on the current share bus BUS, the noise is let to the ground side, thereby preventing occurrence of circuit oscillation resulting from the noise.

In the conventional circuit configuration shown in FIG. 3, the diode D1 is inserted between the input terminals of the current balance amplifier A1 as described above. Accordingly, once the capacitor Cg retains an electric charge, the capacitor Cg is not easily dischargeable.

On the other hand, according to this embodiment, the resistor Rd0 is inserted between the input terminals of the current balance amplifier A1, and the resistor Rd1 is provided to facilitate discharging of the capacitor Cg. Accordingly, the capacitor Cg is discharged easily. As a result, it is possible to prevent an abnormal increase in the differential output of the current balance amplifier A1 due to an increase in the differential input thereto caused by retention of an electric charge in the capacitor Cg.

Further, the resistor Rg is connected in series to the capacitor Cg. This prevents retention of an electric charge in the capacitor Cg due to a variation in the load current, so that it is possible to prevent an abnormal increase in the differential output of the current balance amplifier A1.

Thus, according to the present invention, the diode D1 is inserted in the output part of the current detection amplifier A2 in order to solve the problem of output voltage increase in a current balance circuit of a type that follows up an abrupt change in a load. As a result, even if an electric charge is retained in the capacitor Cg, the potential difference between the V-Ishare terminal and the V-Iout1s terminal is prevented from increasing unnecessarily.

The results of a simulation performed in order to verify the operation and effect of the current balance circuit 10 are shown below.

Figure 11A:
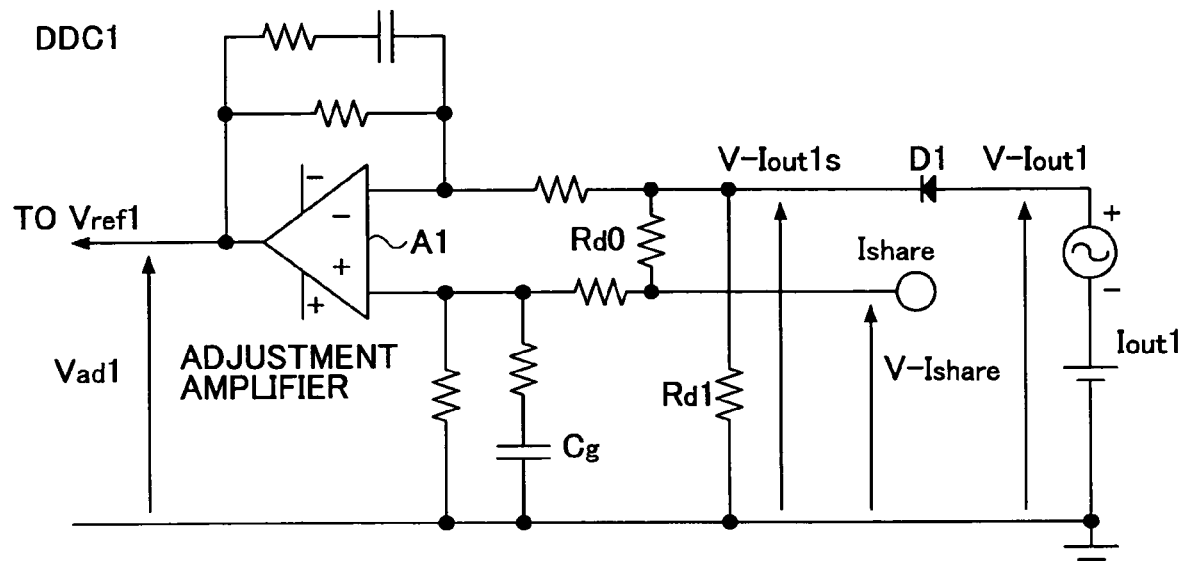
FIGS. 11A and 11B are a circuit diagram and a waveform chart, respectively, for illustrating simulation results based on the configuration of FIG. 10 according to the embodiment of the present invention.
Figure 11B:
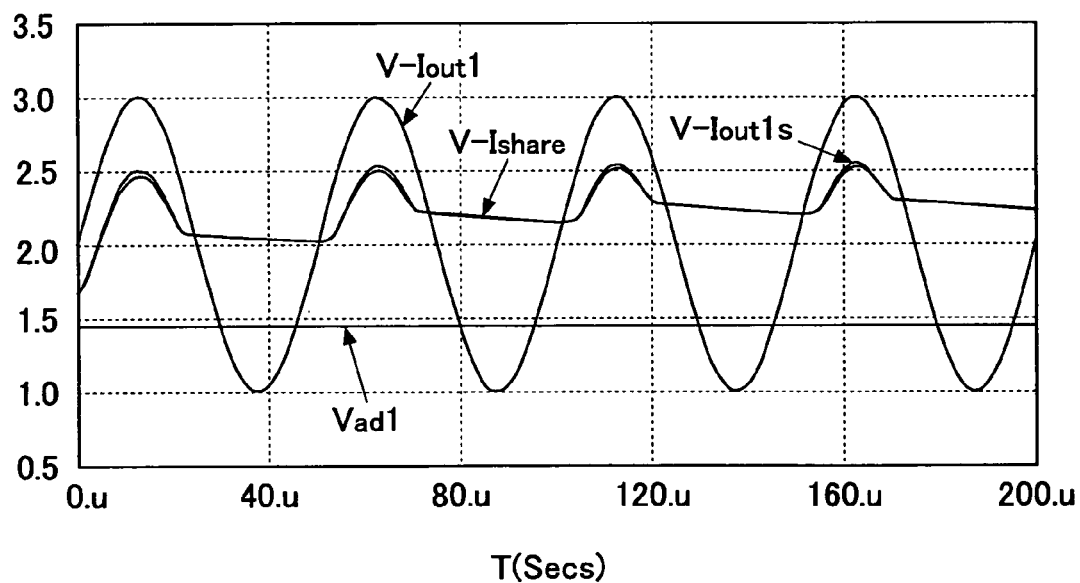

First, the results of an analysis of an operation in the case where the load currents of DDCs vary in the same phase and in the same state are shown. The analysis was performed using a circuit configuration shown in FIG. 11A. FIG. 11B shows operational waveforms in a case where the resistor Rd1 is 200 kΩ and the variation frequency of the electric potential V-Iout1 corresponding to the load current ILOAD is 20 kHz.

As shown in FIG. 11B, it has been confirmed that even when discharging of the capacitor Cg is slow, the potential difference between V-Ishare and V-Iout1s is prevented from widening, so that no voltage increase occurs in a differential output Vad1 so as to make it possible to maintain a normal operation.

Next, the results of a simulation performed by connecting two circuits of the circuit configuration of FIG. 10 are shown.

Figure 12A:
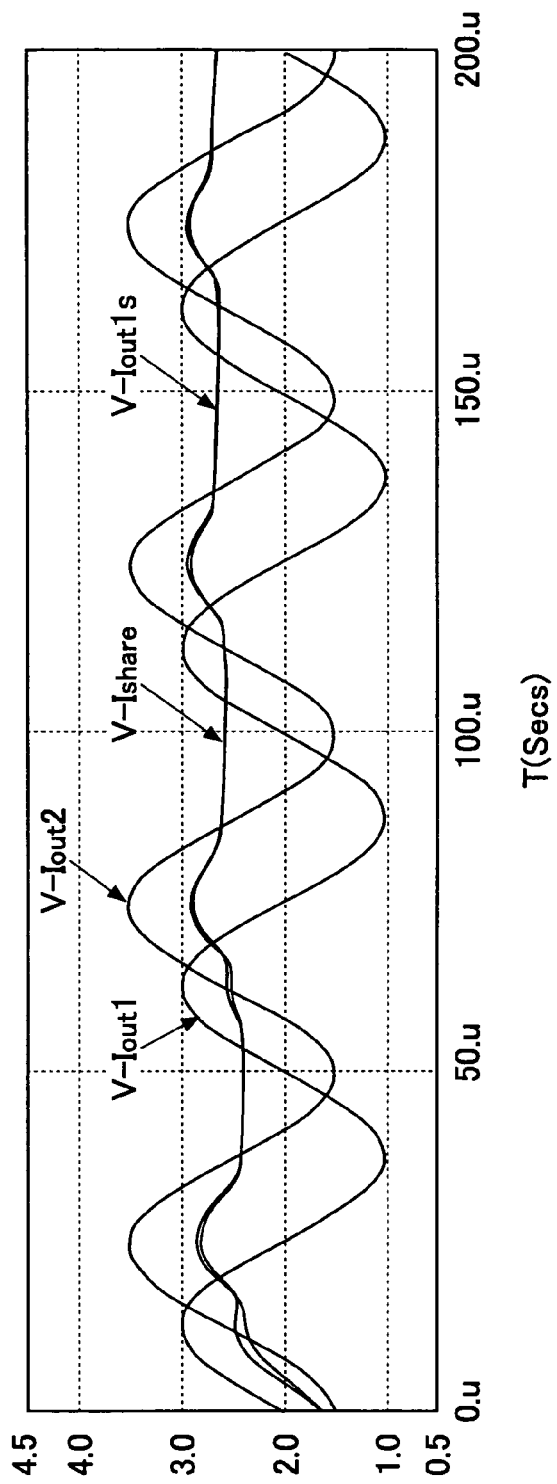
FIGS. 12A and 12B are waveform charts for illustrating the simulation results based on the configuration of FIG. 10 according to the embodiment of the present invention.
Figure 12B:
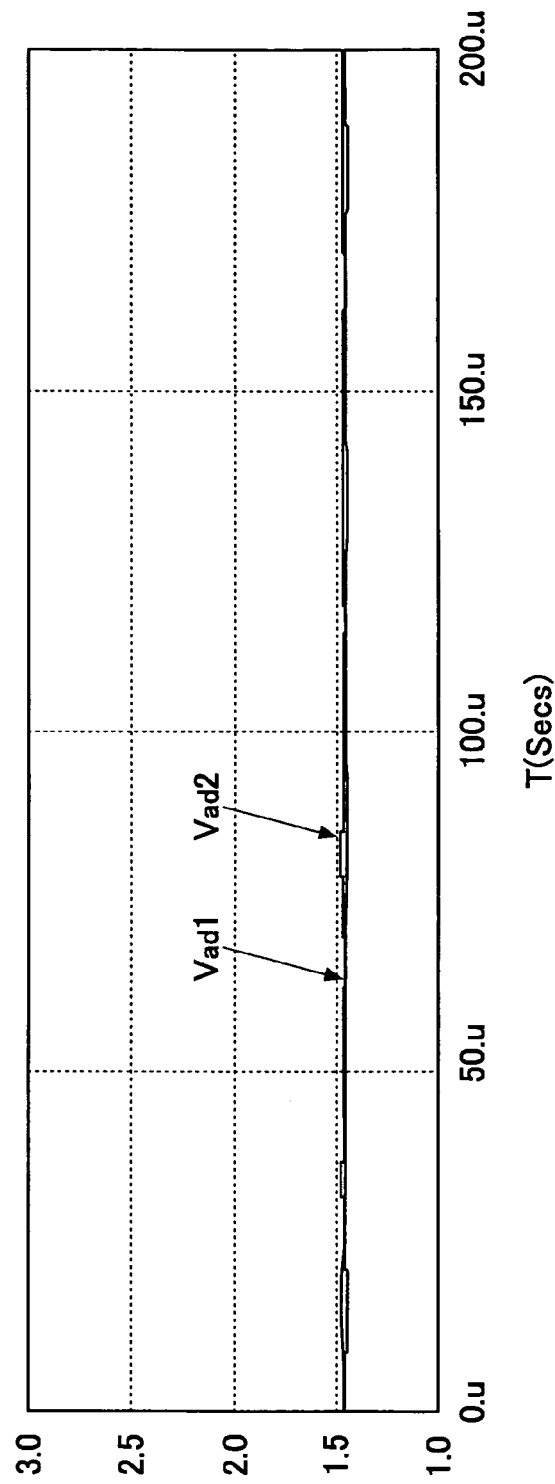

FIGS. 12A and 12B show the operational waveforms of current balance circuits obtained in this case.

FIGS. 12A and 12B show that even when there is a phase difference between the output currents of two DDCs, the differential output voltage Vad1 of the comparator circuit is prevented from increasing and maintains a steady-state value. Accordingly, it has been verified that the problem of output voltage increase that can occur because of a variation in load current can be solved in the circuit method according to this embodiment.

Figure 13:
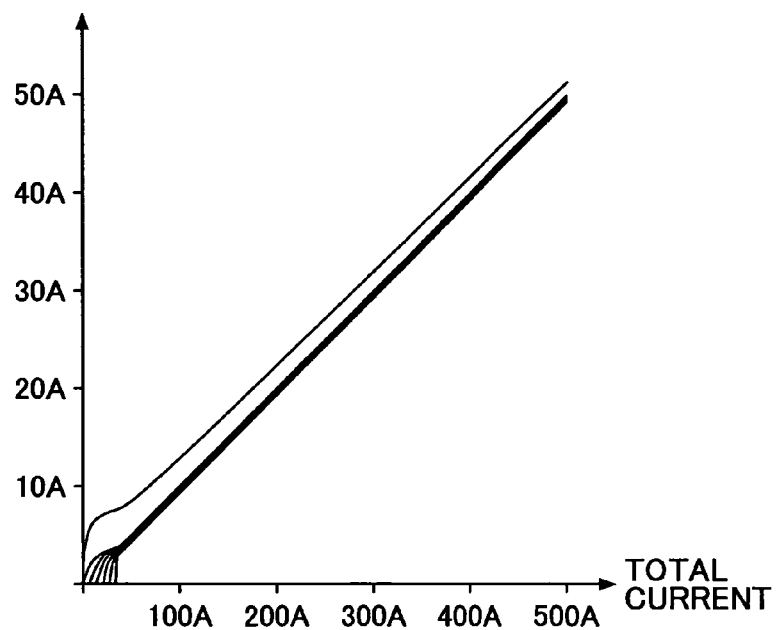
FIG. 13 is a graph for illustrating the operation in the configuration of FIG. 10 according to the embodiment of the present invention.

Next, FIG. 13 shows a static current balance characteristic obtained in the case of performing a parallel operation of ten DDCs according to this embodiment.

FIG. 13 shows that one of the DDCs in which a maximum current flows serves as a reference and is followed up by the other DDCs, so that an excellent current balance characteristic is obtained.

Figure 14:
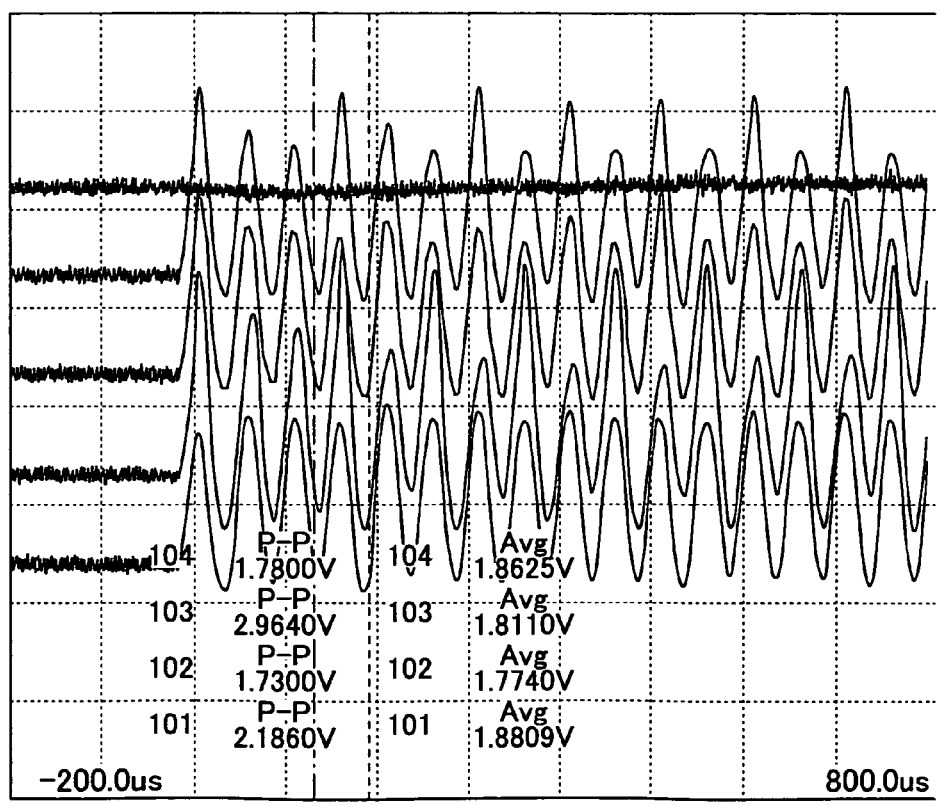
FIG. 14 is a waveform chart for illustrating the simulation results based on the configuration of FIG. 10 according to the embodiment of the present invention.

Further, FIG. 14 shows the results of confirmation of the operations of DDCs according to this embodiment, which confirmation was performed with application of the same load conditions as in the case of occurrence of the output voltage abnormal increase phenomenon described above with reference to FIG. 4. FIG. 14 shows the output current waveforms and output voltage waveforms of four DDCs.

Figure 4:
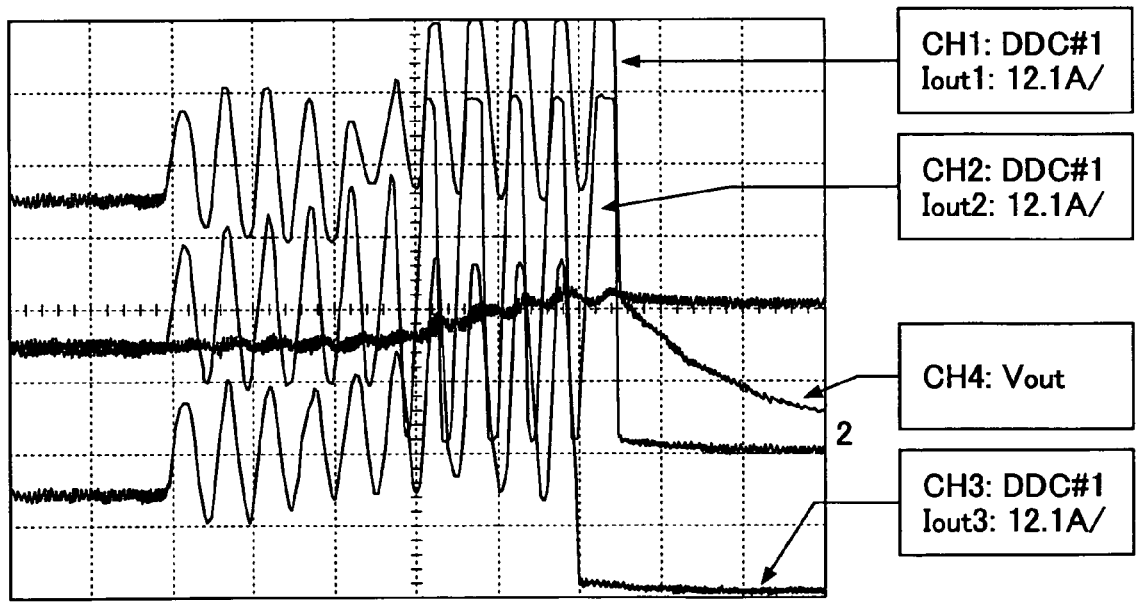
FIG. 4 is a waveform chart for illustrating a conventional problem.
Figure 5:
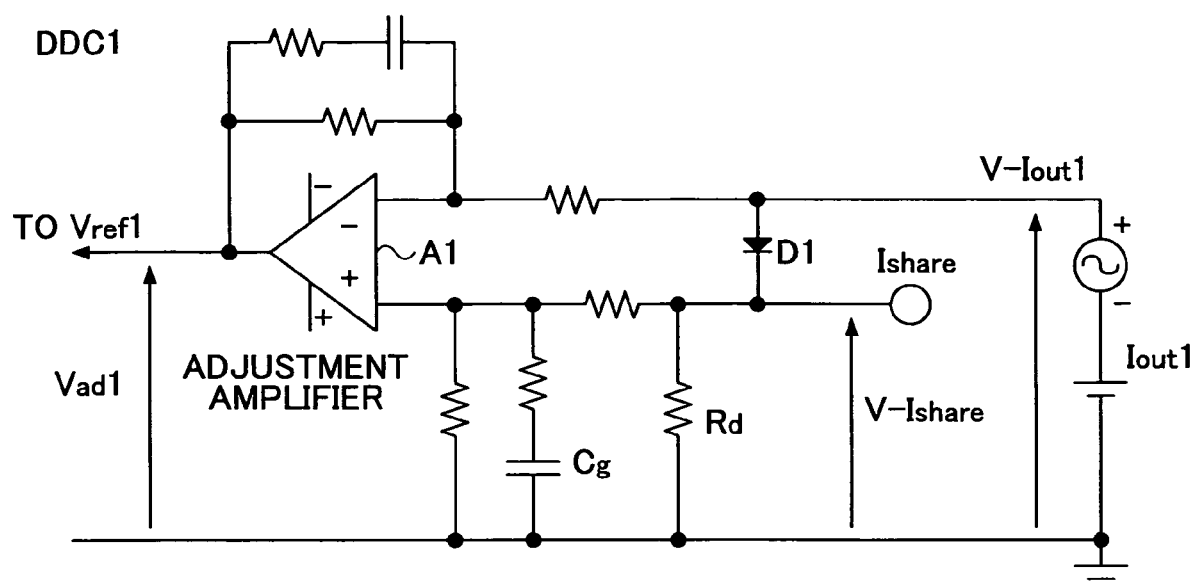
FIG. 5 is a circuit diagram for illustrating the conventional problem.
Figure 6A:
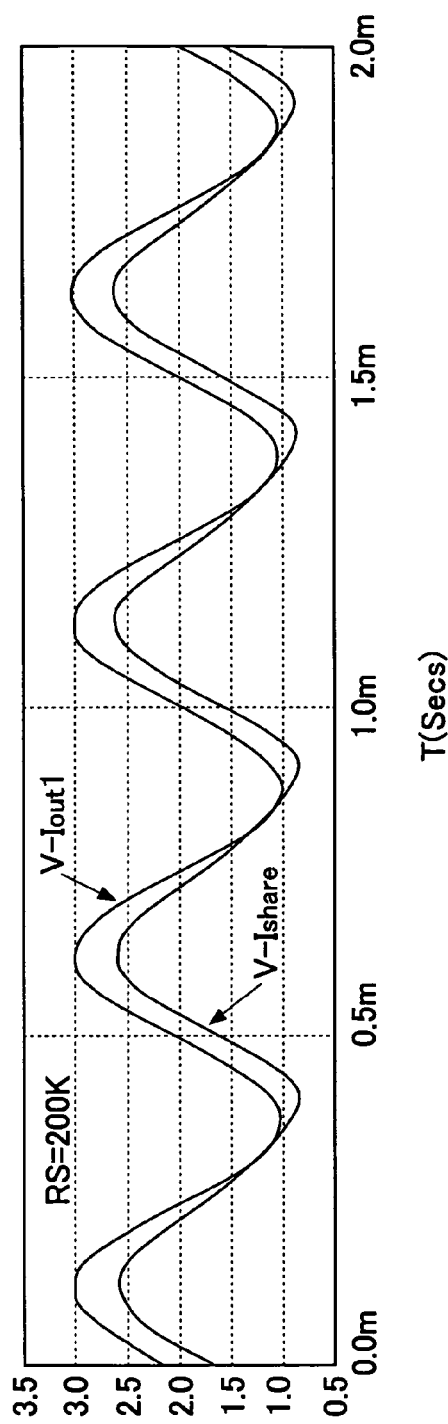
FIGS. 6A and 6B are waveform charts for illustrating the conventional problem.
Figure 6B:
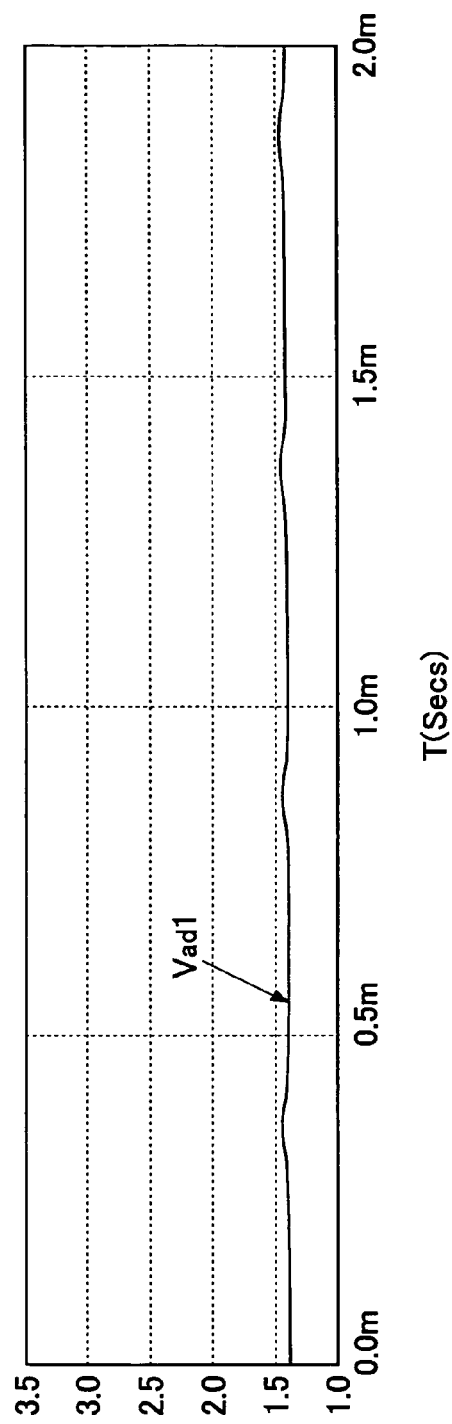
Figure 7A:
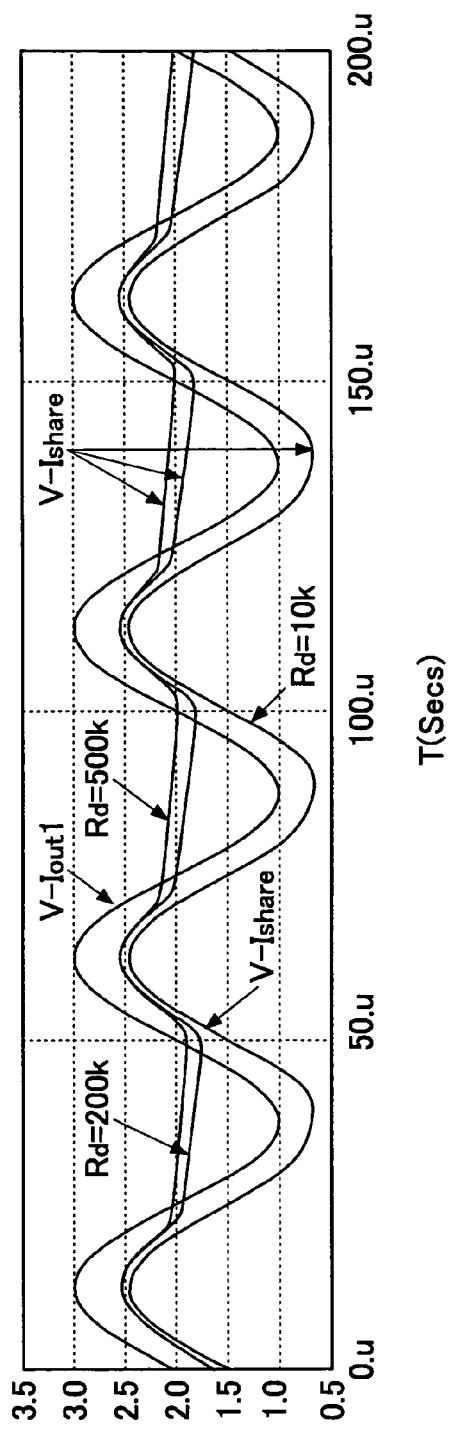
FIGS. 7A and 7B are waveform charts for illustrating the conventional problem.
Figure 7B:
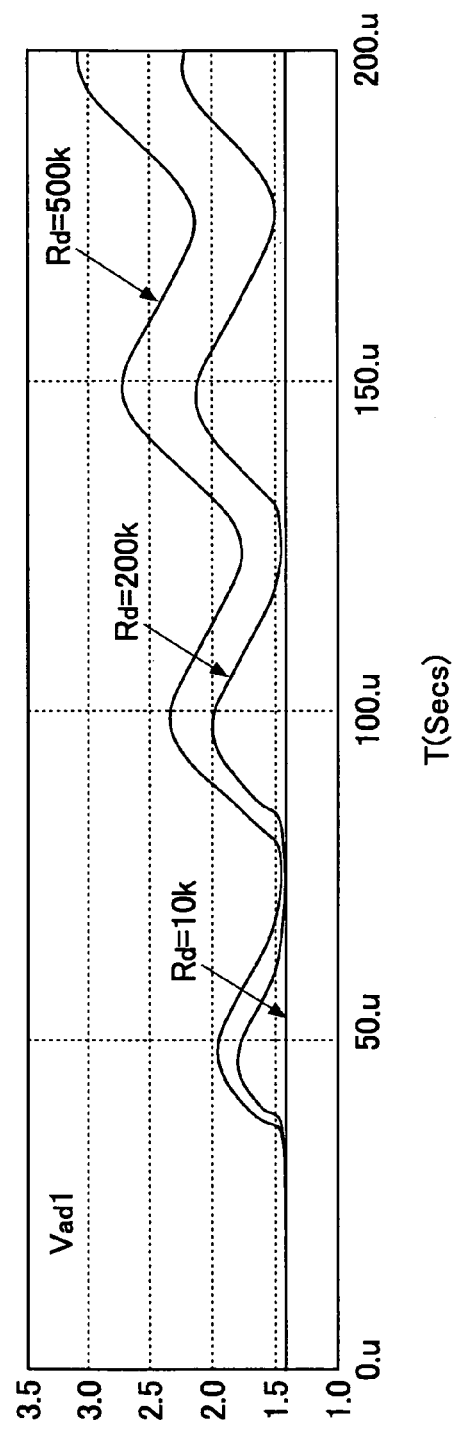
Figure 8:
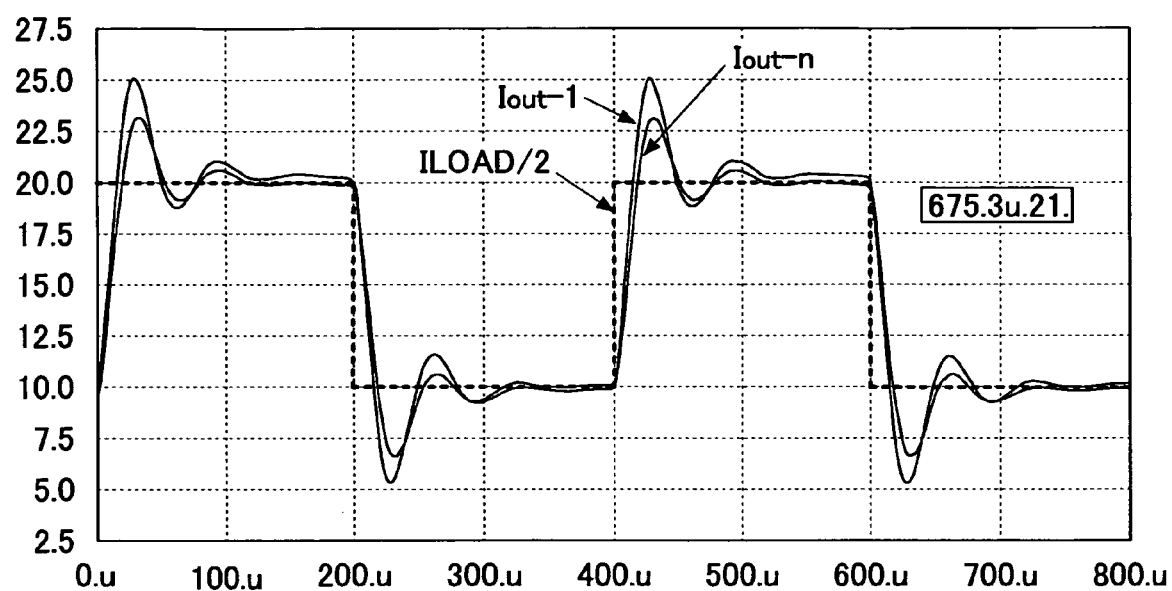
FIG. 8 is a waveform chart for illustrating the conventional problem.

As shown in FIG. 14, it has been confirmed that the output voltages of the DDCs are kept constant even if an abrupt change repeatedly occurs in a load as in FIG. 4.

Effects according to the embodiment of the present invention based on these experiments may be summarized as follows.

In the conventional circuit configuration of FIG. 3, only abrupt load changes equal to or below ΔIout=20 App (50% of a rating of 40 A) can be followed up even with a load capacitor of 4000 μF.

On the other hand, according to the circuit of this embodiment shown in FIG. 10, an abrupt load change of ΔIout=40 App (100% of the rating of 40 A) can be followed up with a load capacitor of 1300 μF.

FIGS. 15A through 15D, 16, 17A through 17D, and 18 are graphs and diagrams for illustrating effects by the circuit configuration of this embodiment in contrast to the conventional circuit configuration.

As graphically illustrated, in the conventional circuit, since the diode D1 is inserted between the input terminals of the current balance amplifier A1, a variation in the current share bus potential V-Ishare is blocked by the diode D1, so that the electric potential V-Iout1s coupled to the inverting input terminal of the current balance amplifier A1 follows up only an electric potential indicating the load current ILOAD (FIGS. 17B and 17C). As a result, when the current share bus potential V-Ishare increases, the differential input of the current balance amplifier A1 increases, so that its differential output increases, thus resulting in an abnormal increase in output voltage (FIG. 17D).

On the other hand, according to the configuration of this embodiment, the resistor Rd0 is inserted instead of the diode D1 between the input terminals of the current balance amplifier A1 as shown in FIG. 16. Accordingly, a variation in the current share bus potential V-Ishare affects, through the resistor Rd0, the electric potential V-Iout1s coupled to the inverting input terminal of the current balance amplifier A1. As a result, the electric potential V-Iout1s increases with the current share bus potential V-Ishare when the current share bus potential V-Ishare increases (FIGS. 15A and 15C). In consequence, even when the current share bus potential V-Ishare increases, the differential input of the current balance amplifier A1 is prevented from increasing more than necessary. As a result, an abnormal increase in the differential output of the current balance amplifier A1 is prevented, so that no abnormal increase occurs in output voltage.

Figure 19:
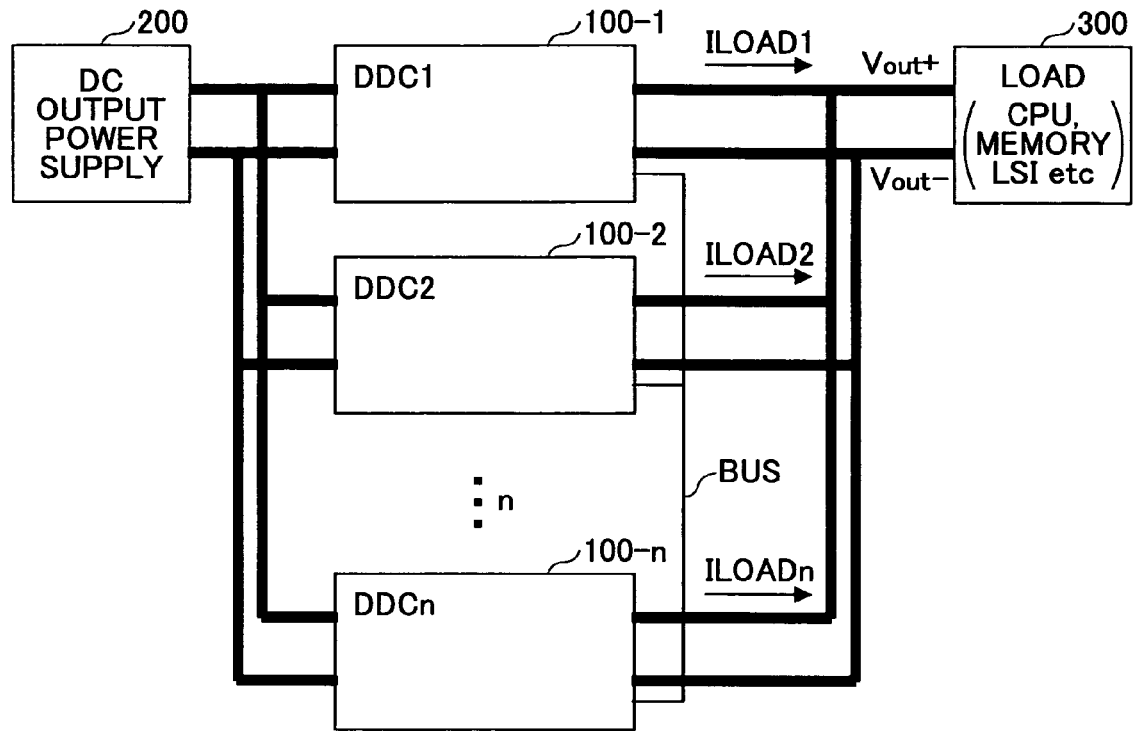
FIG. 19 is a block diagram showing a configuration of a power supply to which the configuration of FIG. 10 is applied according to the embodiment of the present invention.

FIG. 19 is a block diagram showing a configuration of the power supply according to this embodiment. In the power supply of FIG. 19, the n DDCs 100-1 through 100-n, each including the current balance circuit 10 of the circuit configuration of FIG. 10, are connected in parallel to one another, and share with one another in supplying load current.

As graphically illustrated, according to this power supply, DC power is supplied from a DC output power supply unit 200 to the parallel-connected DDCs 100-1 through 100-n. The above-described "N+1 parallel redundant mode" is applied to these parallel-connected DDCs. That is, n−1 of the n DDCs are sufficient as actually required load capacity. Accordingly, even if one of the DDCs becomes unusable because of failure, no problem is caused in power supply.

The outputs ILOAD1 through ILOADn of the n parallel DDCs 100-1 through 100-n are supplied to a load 300. The load 300 may include load devices such as a CPU, memory, and LSI. In a single system, the n DDCs are divided into multiple groups of DDCs, and each group of DDCs is connected to a corresponding one of the load devices.

As described above, the DDCs 100-1 through 100-n are interconnected via the current share bus BUS.

FIG. 20 is a block diagram showing an internal configuration of each of the parallel DDCs 100-1 through 100-n shown in FIG. 19.

As graphically illustrated, the DDC 100-1 includes the DC-DC voltage conversion part 20, the PWM comparator 40, the oscillator 30, and the current balance circuit 10 shown in FIG. 10. The DC-DC voltage conversion part 20 converts a DC supply voltage supplied from the DC output power supply unit 200, using switching of a rectifier element and a smoothing function by a smoothing circuit, and outputs the converted DC voltage. The PWM comparator 40 supplies a pulse signal of predetermined duty to the DC-DC voltage conversion part 20 as described above. The oscillator 30 supplies a triangle wave to the PWM comparator 40 as described above.

An output voltage signal for feedback is extracted from the output terminal of the DC-DC voltage conversion part 20, and is input to the inverting input terminal of the voltage control amplifier A3 of the current balance circuit 10 as described above.

Further, although not graphically illustrated in FIG. 20, the current detection amplifier A2 is connected through the resistor RS to the output line of the DC-DC voltage conversion part 20 as shown in FIG. 10, and detects the load current of the DDC 100-1 as described above.

The current balance amplifier A1 corresponds to a load current comparison part, the voltage control amplifier A3 corresponds to a supply voltage comparison part, the diode D1 corresponds to a directional impedance element, the capacitor Cg corresponds to a capacitive element for high frequency removal, the resistor Rd0 corresponds to a non-directional impedance element, the resistor Rd1 corresponds to an impedance element for discharging the capacitive element, and the resistor Rg corresponds to an impedance element connected in series to the capacitive element for high frequency removal.

The present invention is not limited to the specifically disclosed embodiments, and variations and modifications may be made without departing from the scope of the present invention.

The present application is based on Japanese priority patent application No. 2005-078003, filed on Mar. 17, 2005, the entire contents of which are hereby incorporated by reference.

What is claimed is:

1. A power supply to be connected in parallel to one or more other power supplies so as to share with the other power supplies in supplying load current to a load, the power supply comprising:

a current detection amplifier configured to detect the load current supplied by the power supply and output a signal indicating the load current supplied by the power supply;

a differential amplifier having a first input terminal and a second input terminal, wherein the first input terminal is connected to a first input terminal of a respective differential amplifier of each of the other power supplies, the signal output by the current detection amplifier is input to the second input terminal of the differential amplifier, and the differential amplifier outputs a signal indicating a difference in level between a signal input to the first input terminal and the signal indicating the load current input to the second input terminal;

a first non-directional impedance element connecting the second input terminal of the differential amplifier to ground; and a second non-directional impedance element connecting the first input terminal of the differential amplifier and the second input terminal of the differential amplifier.

2. The power supply as claimed in claim 1, wherein:

the signal, indicating the load current supplied by the power supply, is input to the second input terminal of the differential amplifier through a directional impedance element;

the directional impedance element blocks the signal when a level of the load current supplied by the power supply is lower than a level of a maximum one of respective load currents of the one or more other power supplies; and a capacitive element, removing high frequency signals, connected to the first input terminal of the differential amplifier.

3. The power supply as claimed in claim 2, further comprising:

an impedance element discharging the capacitive element.

4. The power supply as claimed in claim 2, further comprising:

an impedance element connected in series with the capacitive element.

5. The power supply as claimed in claim 1, further comprising:
- a supply voltage comparison part comparing a signal indicating a supply voltage supplied by the power supply and a signal in which an output signal of the load current comparison part is superposed on a signal indicating a reference voltage of the supply voltage;
- a PWM comparison part configured to compare an output signal of the supply voltage comparison part and a triangle wave signal; and
- a supply voltage generation part generating the supply voltage corresponding to a duty ratio of an output of the PWM comparison part,
- wherein the supply voltage comparison part controls the supply voltage generation part through the PWM comparison part so that a level of the supply voltage is equalized with a level of the superposition of the output signal of the load current comparison part and the reference voltage.

6. A power supply to be connected in parallel to one or more other power supplies so as to share with the other power supplies in supplying load current to a load, the power supply comprising:
- a current detection amplifier configured to detect the load current supplied by the power supply and output a signal indicating the load current supplied by the power supply;
- a load current comparison part configured to compare a signal indicating a maximum one of respective load currents of the power supplies and the signal output by the current detection amplifier;
- a non-directional impedance element inserted between input terminals of the load current comparison part;
- a directional impedance element blocking the load current supplied by the power supply when a level of the load current supplied by the power supply is lower than a level of the signal indicating the maximum one of the respective load currents of the one or more other power supplies; and
- a capacitive element removing high frequency signals,
- wherein the non-directional impedance element is inserted between the load current comparison part and the signal indicating the load current supplied by the power supply.

7. The power supply as claimed in claim 6, further comprising:
- an impedance element discharging the capacitive element.

8. The power supply as claimed in claim 6, further comprising:
- an impedance element connected in series with the capacitive element.

9. The power supply as claimed in claim 6, further comprising:
- a supply voltage comparison part comparing a signal indicating a supply voltage supplied by the power supply and a signal in which an output signal of the load current comparison part is superposed on a signal indicating a reference voltage of the supply voltage;
- a PWM comparison part comparing an output signal of the supply voltage comparison part and a triangle wave signal; and
- a supply voltage generation part configured to generate the supply voltage corresponding to a duty ratio of an output of the PWM comparison part,
- wherein the supply voltage comparison part controls the supply voltage generation part through the PWM comparison part so that a level of the supply voltage is equalized with a level of the superposition of the output signal of the load current comparison part and the reference voltage.

10. A power supply to be connected in parallel to at least one other power supply to share supplying load current to a load, comprising:
- a current detection amplifier configured to detect the load current supplied by the power supply and output a signal indicating the load current supplied by the power supply;
- a differential amplifier in each power supply having first and second input terminals, the first input terminals of respective differential amplifiers of the power supplies being connected in common and the signal output by the current detection amplifier being input to the second input terminal of the corresponding differential amplifier of the power supply;
- a first non-directional impedance element connecting the second input terminal of the differential amplifier to ground, in each power supply; and
- a second non-directional element connecting the first input terminal of the differential amplifier and the second input terminal of the respective differential amplifier of each power supply.

11. The power supply as claimed in claim 1, wherein the first non-directional impedance element and the second non-directional impedance element are resistors.

12. The power supply as claimed in claim 10, wherein the first non-directional impedance element and the second non-directional impedance element are resistors.

* * * * *